United States Patent [19]

Farnier

[11] 4,088,021
[45] May 9, 1978

[54] FLUID COUNTER

[76] Inventor: André Farnier, 76 rue d'Aguesseau, Boulogne Hauts de Seine, France

[21] Appl. No.: 751,245

[22] Filed: Dec. 16, 1976

[30] Foreign Application Priority Data

Dec. 24, 1975 France .................................. 75 39701

[51] Int. Cl.² .............................................. G01F 1/07
[52] U.S. Cl. ..................................................... 73/229
[58] Field of Search .................. 73/229, 230; 415/131, 415/132

[56] References Cited

U.S. PATENT DOCUMENTS

| Re. 26,654 | 8/1969 | Lee et al. | 73/229 |
|---|---|---|---|
| 148,026 | 3/1974 | Boyle | 73/230 |
| 187,233 | 2/1977 | Park | 73/230 |
| 470,033 | 3/1892 | Beckmann | 73/229 |
| 484,465 | 10/1892 | Schon | 73/229 |
| 2,052,794 | 9/1936 | Petot | 73/230 |

*Primary Examiner*—Herbert Goldstein
*Attorney, Agent, or Firm*—Seidel, Gonda & Goldhammer

[57] ABSTRACT

The present invention relates to a fluid counter, and more particularly to a liquid counter. The fluid counter includes a rotor which is equipped with a shaft. One end of the shaft terminates at a point which is used solely for low flow rates. The other end of the shaft terminates at a flattened sturdy surface which is used solely for high flow rates. Each of the ends of the shaft are able to cooperate with corresponding stop members. The distance between the ends of the shaft is slightly smaller than the distance between the stop members. In this manner, the two ends of the shaft cannot simultaneously cooperate with their respective stop member. Thus, the pointed end of the rotor's shaft is put into operation by a low fluid flow rate and the flattened end by a high fluid flow rate.

7 Claims, 8 Drawing Figures

Fig._4
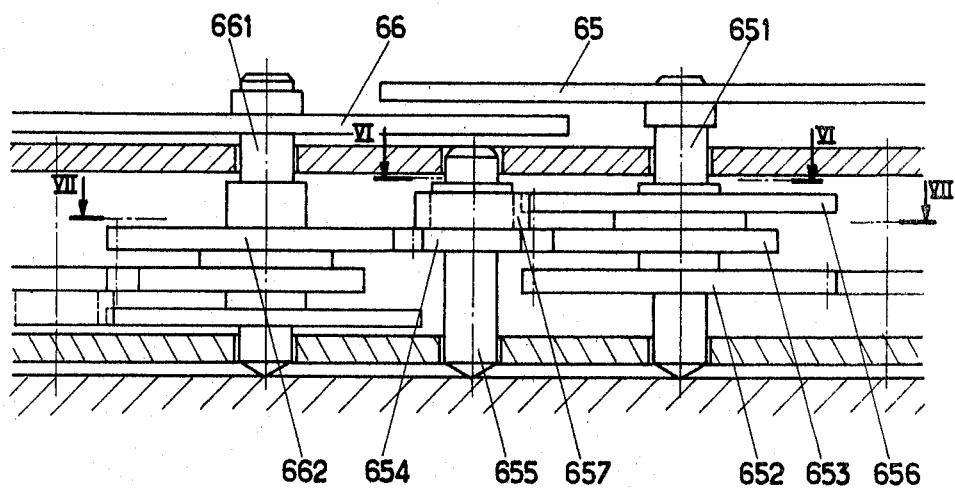
Fig._5
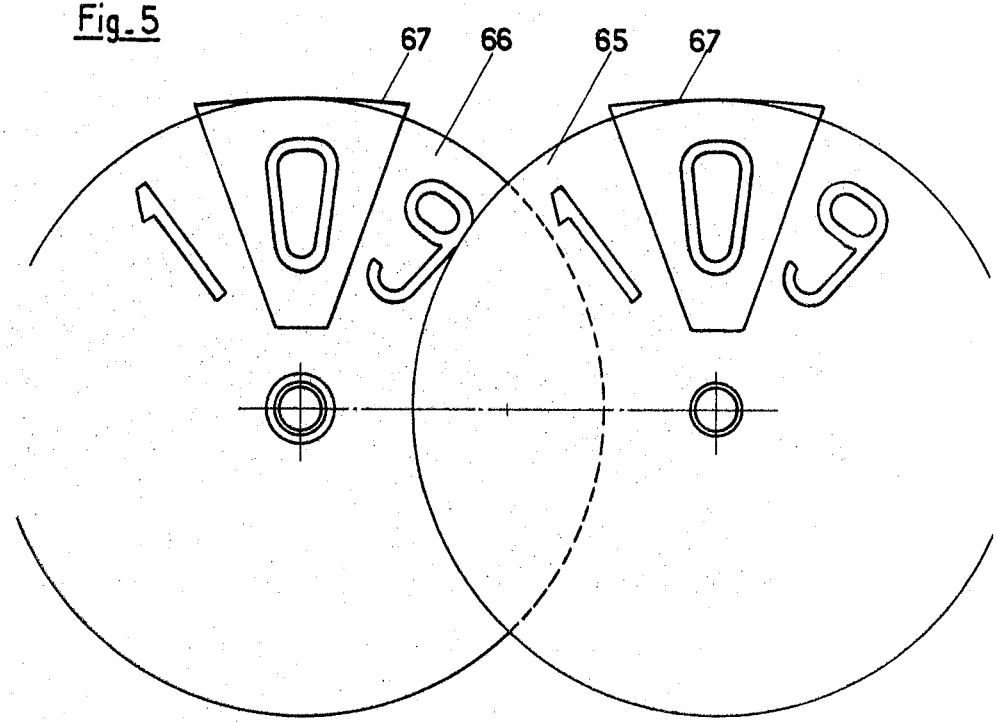

Fig. 6
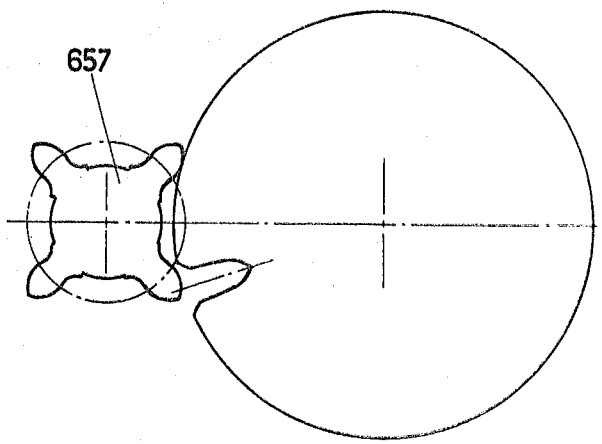
Fig. 7
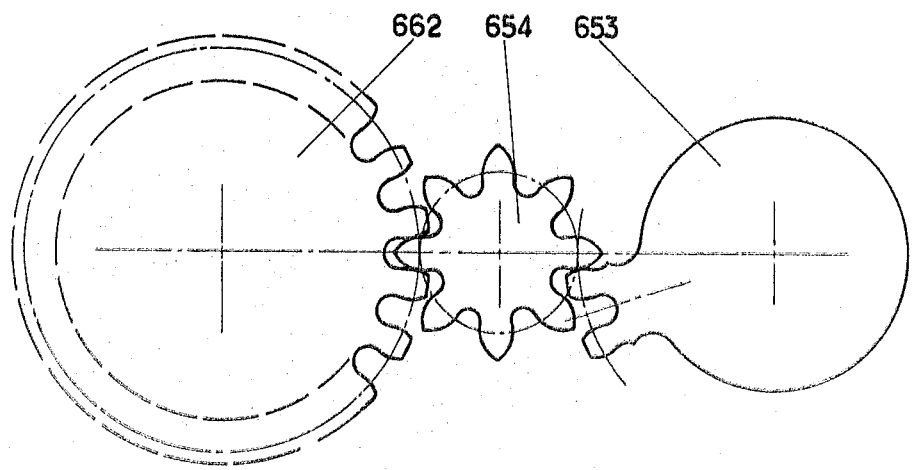
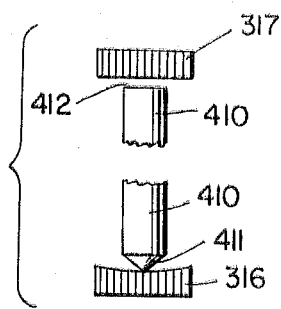
Fig. 8

FLUID COUNTER

The present invention relates to a fluid counter.

Fluid counters are known having a sensing device such as a bladed wheel, which give readings as a function of the flow rate. The readings are transmitted to a counting and display mechanism of the measured quantities.

However, such devices often have an intrinsic lack of sensitivity, which is more pronounced during use. These shortcomings are generally due to the design of the moving parts, the necessary sturdiness of certain parts being incompatible with the reduction of friction.

The counting device or adder either has pointers which makes reading ambiguous and difficult or has drums and jumping figures with significant axial and lateral frictions which are disadvantageous to sensitivity.

In the case of certain devices, the adder is immersed in the fluid to be measured, leading to obvious disadvantages. In the case of other devices, this is avoided by interpositioning a sealing member which absorbs energy.

The object of the invention is to obviate these deficiencies by improving the intrinsic of the counter and maintaining the sensitivity over a long period of time.

The invention relates to a fluid counter which has for its measuring member a bladed wheel which is driven by the speed of the fluid circulating in the body of the apparatus.

The member which rotates fastest, namely the bladed wheel has a low weight. Its shaft is vertical and is terminated in its lower part by a fine point and in its upper part by a flat stop member.

In the case of a low flow rate, the shaft rests on its fine point which ensures the sensitivity. When the flow rate increases, the lower pivot is progressively disengaged until it is raised and supported on the upper stop member. The upper stop member serves to withstand the axial thrust, and consequently, the lower pivot is protected and the sensitivity is fully maintained.

An opposite combination is also conceivable with the bladed wheel and its floating shaft with a low axial thrust in the fluid and the upper stop member having a fine point for low flow rates, the bladed wheels being thrust downwards onto a stop member which resists the axial thrust.

The bladed wheels are supported on their upper stop member as soon as the driving torque is sufficient to overcome, without influencing the counting process, the opposing supplementary torque produced by its new operating position.

The axial component directed towards the upper stop member is low, in order to reduce the dimensions of the stop member and a shaft, thus reducing the opposing torque of the shaft to low flow rates.

According to a feature of the invention the rotor is formed by a hub carrying radial blades. The height of the latter is double the thickness of the hub and are fixed thereto by means of their upper portion. The lower base of the hub is thus located in the median axis of the blades.

According to another feature of the invention, the injector is in the form of a nozzle. The injection axis of the fluid flow is orthogonal to the rotation axis of the movement. This fluid flow penetrates a chamber where the bladed wheel is located and gives rise to forces having various directions and which are partly applied to the movement and whose resulting quantity always has a component located in the rotation axis of the bladed wheel. This axial component is used on raising the bladed wheel and its shaft.

According to another feature of the invention, the baffles are vertical planes located in the projection of the blades and located on the side of the pivot to be protected. Their number is such that they have a concentric and balancing action. Their height is equal to half or more than half the width of the blades.

According to another feature of the invention, the chamber of the bladed wheel has no unevenness, except for the actual baffles and the upper face is located at a distance equal to half or more than half the width of the blades so as not to create a return effect which opposes the raising.

According to another feature of the invention, the adder has jumping figures inscribed on disks, whereof each of the vertically located spindles pivot on a fine point.

According to another feature of the invention, this adder is placed in a lubricant bath connected with the movement via a shaft which rotates freely in its bearings, the sealing between the lubricant and the fluid to be measured being ensured by a capillary system.

According to another feature of the invention, the counter, which has an entirely mechanical transmission, uses the laminar effect to increase its sensitivity.

The present invention will be described in greater detail relative to an embodiment of a fluid counter shown schematically in the attached drawings, wherein there is shown in:

FIG. 1—a vertical sectional view of a single tangential jet counter mounted in a pipe;

FIG. 2—a partial sectional view II—II of FIG. 1;

FIG. 3—a partial sectional view according to III—III of FIG. 1;

FIG. 4—a schematic sectional view of part of the counting mechanism of the not shown counter in detailed manner with regard to FIG. 1;

FIG. 5—a plan view of part of the counting mechanism showing the display disks;

FIG. 6—a simplified sectional view along the line VI—VI of FIG. 4;

FIG. 7—a simplified sectional view along the line VII—VII of FIG. 4. FIG. 8—an elevational view in enlarged scale illustrating the lower fine point of the shaft in contact with its lower stop member and the upper end out of contact with its upper stop member.

According to FIG. 1, the fluid counter is to be mounted between the ends 1 and 2 of a pipe traversed by a fluid travelling in the direction of arrow A. The counter comprises a body 3 containing a sensor 4 provided internally with a bladed rotor 41 rotated by the passage of the fluid. The rotor 41 is connected via a transmission 5 to a counting assembly 6 permitting the display of the flow or volume of the fluid.

The counter is connected to the ends 1 and 2 of the pipe by nuts 11 and gaskets 12.

The sensor of the counter comprises a substantially cylindrical box 31, terminated by two sleeves 32, 33 ensuring the connection between the ends 1, 2 of the pipe. The bladed rotor 41 is located in the fluid flow path and slightly off-center relative to the fluid passage axis X—X (cf FIGS. 1 and 2).

At one end, the shaft 410 of the rotor is terminated by a point 411 cooperating with a conical or rounded thrust bearing. The other end 412 of shaft 410 of rotor 41 is flat, said end cooperating with a thrust bearing having a flat stop member.

The length of shaft 410 of rotor 41 is selected in such a way that one or the other of the ends 411, 412 cooperate with its thrust member bearing, but that the two ends cannot be simultaneously supported on the respective thrust bearings.

Rotor 41 also carries a toothed wheel 413, integral in rotation therewith. This toothed wheel meshes with a pinion 51 of the transmission no matter what the operating position of the rotor happens to be.

Rotor 41 is formed by a hub 414, integral with shaft 410. The blades 415 located radially on hub 414 have a heigth which is double the thickness of the said hub 414 and are integral via their upper portion with the latter. The lower base 414a of the hub 414 is located in the median axis of the blades 415, substantially at the height of axis X—X of the injector.

The bearing 311 of the intermediate lower plate 310 rises beyond the lower edge of blades 415 of rotor 41, in order to approach the base 414a of hub 414. This arrangement has the advantage of maintaining the shaft by its bearing very close to the application point of the radial force component applied to the bladed wheel, thus reducing the shaft cross-section and improving sensitivity.

The upper part of the hub 44 is terminated by toothed wheel 413 which partly traverses the upper plate 313 in order to cooperate with the transmission 5.

Upstream of the sensor, in the fluid flow direction A is provided an injector 7 located in the upstream sleeve 32. The injector 7 comprises a tubular sleeve, whose nozzle cross-section narrows between its inlet and its outlet. The outer periphery of the sleeve has a shoulder 71 which cooperates with a complementary shoulder 321 of the counter body. Shoulders 71, 321 are provided in such a way that the fluid thrust applies injector 7 against its housing in the counter body.

The lower thrust bearing 316 is carried by a lower intermediate plate 310 which seals the chamber of sensor 4. This intermediate plate 310 has a relatively high bearing 311 which receives the shaft 410 of counter 41 over a relatively large portion of its length and substantially in the center of pressure. The intermediate plate 310 also has radial ribs 312 which form baffles. The upper portion of the chamber of sensor 4 is occupied by a smooth partition 313. The upper thrust bearing 317 is provided in the portion of the body which receives transmission 5.

The intake of the injector 7 issues level with the counter inlet and the outlet of the injector issues level with the sensor chamber. The injector 7 is coaxial to the pipe axis. Said axis does not intersect the rotor axis, but is positioned in such a way that it acts substantially on the center of the rotor vanes, when the latter are perpendicular to axis X—X.

The mechanical part of transmission 5 comprises a pinion 51 meshing with the toothed wheel 413 of rotor 41. This pinion 51 is carried by a spindle 52 mounted in bearings 53 equipped with sealing means. Spindle 52 also carries a pinion 54 which meshes with the intake pinion of the counting mechanism 6. Counting mechanism 6 is located in the upper part 33 of the box 3 of the counter. The upper part 33 is covered by a plate 60 made from glass or transparent material, which defines a chamber containing the counting mechanism 6. A cover 61 connected in articulated manner with an assembly member 62 protects plate 60. This assembly member 62 maintains plate 60 pressed against the upper part 33 of the box, with the interpositioning of a gasket 64.

FIG. 4 represents a developed sectional view of the counting and display mechanism 6. Mechanism 6 comprises a certain number of display disks 65, 66 which carry figures which successively appear in front of window 67 (FIG. 5). These disks are integral with a respective spindle 651, 661 carrying the inlet and outlet pinions. The inlet pinions receive their respective movements from the outlet pinion of the adjacent shaft. The first inlet pinion receives its movement from pinion 54 of spindle 52 of transmission 5.

In general manner, the various gears of the counting mechanism 6 are spur gears with vertical spindles pivoting on their points.

In the counting mechanism 6, the display disks are controlled by pinions ensuring the division and step by step advance corresponding to the counting process.

As the counting process is decimal, the disks successively display units, tens, hundreds, etc and between each disk and the following disk a division by ten takes place.

Hereinafter, the elements of the counting mechanism 6 will be described. According to FIGS. 4, 5, 6 and 7, the toothed inlet wheel 652 is continuously driven by the transmission from the rotor, whereby the wheel 653, having two teeth, carried by spindle 651 drives two teeth of the intermediate pinion 654 of axis 655. The slotted disk 656 permits the passage of the tooth which appears on the intermediate pinion. The intermediate pinion 654 drives two teeth of pinion 662 which has in all twenty teeth in such a way that a partial rotation of two teeth of pinion 662 corresponds to 1/10th of a turn. The slotted disk 656 acts on pinion 657 and prevents the rotation of intermediate pinion 654 and pinion 653 performs a complete turn before being able to drive again pinion 657 of axis 655 which has 8 teeth. When spindle 651 has performed a complete turn, spindle 661 performs 1/10th of a turn, corresponding to a division by ten. This division element by ten is repeated for the number of times necessary for the total count.

FIG. 5 shows two disks 65, 66 carrying the figures 0 to 9. These figures successively appear in a window 67 provided in a cover which covers the disks beneath glass 60 which closes the box of the counting and display mechanism 6 of the counter.

FIG. 6 shows the configuration of pinions 656 and 657.

FIG. 7 shows the configuration of pinions 653, 654 arranged in the opposite order to that of FIG. 4.

Figure 1:
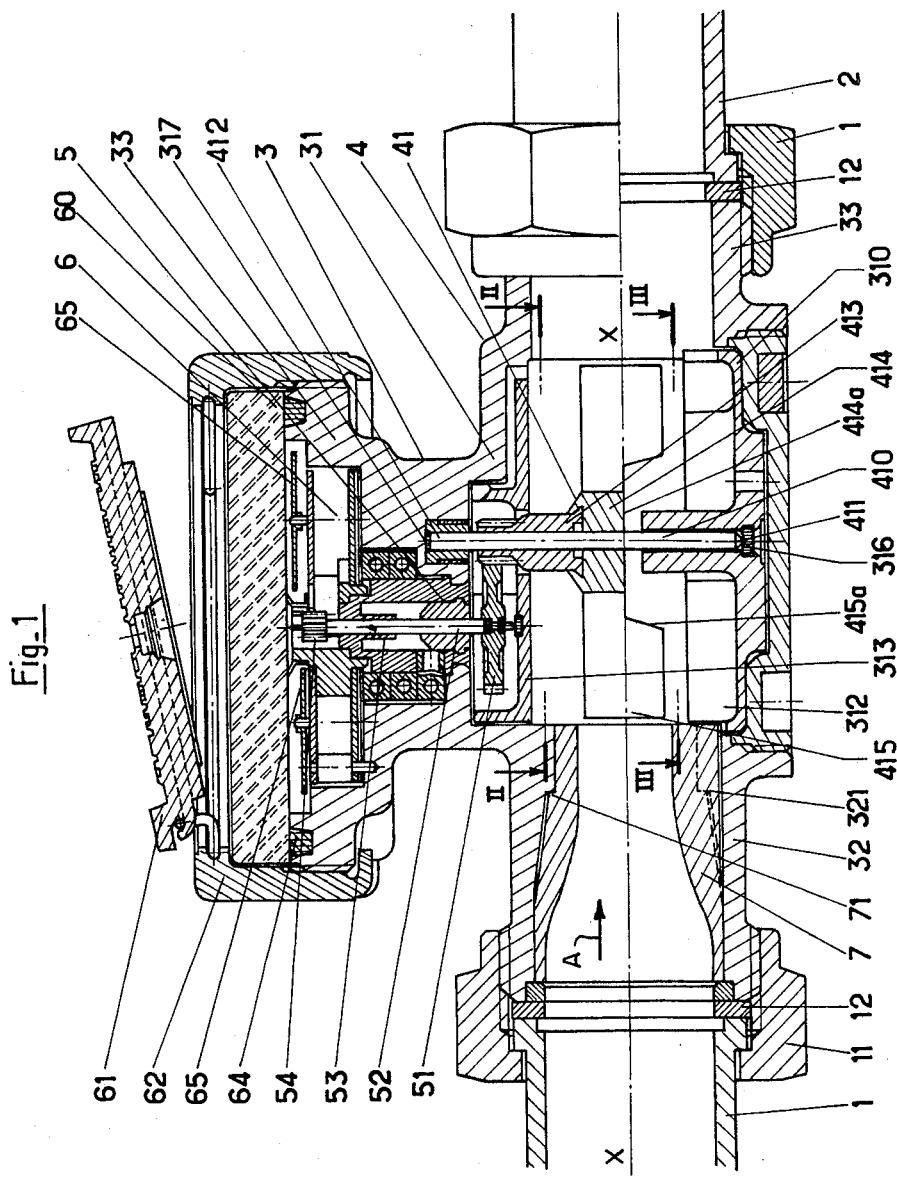
Figure 2:
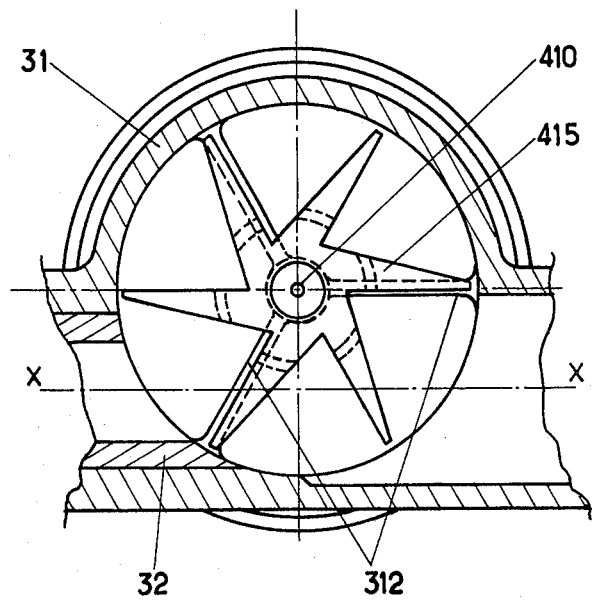
Figure 3:
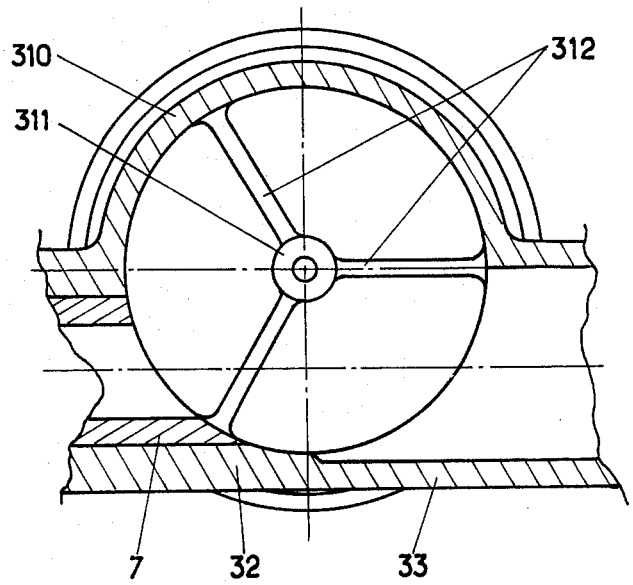

The counting mechanism 6 is submerged in a lubricant and is connected by gears 51, 54 to the sensor and spindle 52 is free in its bearings, lubricant being maintained in the counting mechanism by the means indicated hereinbefore.

The counter described hereinbefore is in particular suitable for water counters. However, other applications can be envisaged in connection with the accurate measurement of the most varied fluids.

The fluid injection and discharge axis is orthogonal to the rotation axis of the movement. The apparatus is positioned horizontally, as shown in the elevation whereby all the movable shafts are vertical and pivot on their lower end by means of a point.

The center of gravity of the complete sensor is located slightly above its center of hydrostatic force, in order to improve sensitivity.

The counter functions in the manner indicated hereinafter.

In the case of low flow rates, the movement sensor represented by the bladed wheel system, whereby its shaft and pinion constitute the first pivoting members has, in the fluid to be measured, a weight which is just sufficient to obtain an excellent pivoting on its lower point. The increasing movement of the fluid in the chamber and consequently the rise in the axial component progressively disengage the lower pivot by raising the sensor until it is supported on the upper stop member, which has appropriate dimensions.

The propellor shape of the blades facilitates raising.

The injector indicated at the inlet of the chamber is shaped like a nozzle, which brings about a very rapid homogenisation of the fine streams of the fluid flow as soon as turbulent operating conditions are obtained (which favors the appearance of the axial component before the pivot is disengaged).

The baffles necessary for regulating the counting process are located on the bladed wheel, that is to say on the side of the pivot to be protected, their shape and positioning also facilitating the raising of the sensor.

The bladed wheel chamber is not prejudicial to the raising process.

The moving members all pivot on fine points and are easily driven by the sensor.

The sensor transmits its movement via the interjunction shaft, free in its bearings, to the adder located in a lubricant bath, consequently with a minimum energy expenditure. The lubricant and fluid to be measured are immiscible with one another.

It has been assumed hereinbefore that the apparent weight or density of the rotor is greater than the density of the fluid measured.

In the case where the density of the rotor 41 is less than that of the fluid to be measured, the ends 411, 412 of shaft 410 of rotor 41 and the corresponding bearings 316, 317 are constructed in the opposite manner, namely the upper end of the rotor shaft is a point and the lower end is flattened, because under these conditions with a low flow rate the rotor is raised, whereas with a high flow rate the rotor is lowered. Therefore, the rotor configuration is the opposite to that described hereinbefore.

Obviously, the invention is not limited to the embodiment described and represented hereinbefore and numerous variants are possible without passing beyond the scope of the invention.

I claim:

1. A fluid counter comprising:
   a sensor having a chamber and a bladed rotor disposed therein;
   said bladed rotor being rotatable by fluid passing through said sensor;
   means for counting and displaying the amount of rotary motion of said rotor and thereby the amount of fluid passing through said sensor;
   transmission means for transmitting the rotary motion of said rotor to said counting and displaying means;
   said rotor including a shaft and a plurality of blades extending therefrom;
   one end of said shaft terminating in a point and the other end of said shaft being flat;
   one end of said shaft being received within a bearing;
   a stop member disposed adjacent each end of said shaft;
   the distance between said stop members being slightly greater than the distance between the ends of said shaft;
   said pointed end of said shaft contacting its adjacent stop member when fluid at a low flow rate passes through said sensor and said flat end of said shaft moves into contact with its adjacent stop member when fluid at a high flow rate passes through said sensor;
   a hub secured about said shaft;
   said blades extending radially from said hub and
   the height of each blade being approximately twice the height of said hub and the lower edge of said hub being located approximately in a plane passing through the median of said blades.

2. A fluid counter in accordance with claim 1 including a nozzle-shaped injector located upstream of said sensor chamber, the axis of said injector being substantially in said median plane of said blades.

3. A fluid counter in accordance with claim 1 including a plurality of baffles, each extending in a vertical plane from the bottom surface of said chamber and extending between said bearing and the inner peripheral wall of said chamber, the height of said baffles being at least one-half the height of said blades.

4. A fluid counter in accordance with claim 1 wherein the upper face of said chamber is separated from said blades by a distance which is at least half the height of the blades.

5. A fluid counter in accordance with claim 1 wherein said counting and display means includes an adder with discs having display numbers and said discs are carried by vertical spindles each pivotable on a fine point.

6. A fluid counter in accordance with claim 5 wherein said adder is disposed in a lubricant bath, a freely rotatable spindle transmits the rotary motion of said shaft to said adder, and a capillary system forms the seal between said lubricant and the fluid passing through said chamber.

7. A fluid counter in accordance with claim 1 wherein the axis of said injector is substantially perpendicular to and offset from the axis of rotation of said shaft.

* * * * *